United States Patent [19]

Shadman et al.

[11] Patent Number: 5,302,356
[45] Date of Patent: Apr. 12, 1994

[54] ULTRAPURE WATER TREATMENT SYSTEM

[75] Inventors: Farhang F. Shadman; Robert A. Governal, both of Tucson, Ariz.

[73] Assignee: Arizona Board of Reagents Acting on Behalf of University of Arizona, Tucson, Ariz.

[21] Appl. No.: 845,988

[22] Filed: Mar. 4, 1992

[51] Int. Cl.[5] .............................. B01J 19/12
[52] U.S. Cl. ................... 422/186.3; 422/186; 422/905; 210/192; 210/198.1; 210/748; 210/760; 210/763; 210/900; 250/436; 204/157.44
[58] Field of Search ............. 210/192, 198.1, 500.25, 210/500.26, 506, 748, 763, 760, 900; 422/186.3, 24, 186, 905; 250/436, 437, 438; 261/DIG. 42; 204/157.44

[56] References Cited

U.S. PATENT DOCUMENTS

| | | | |
|---|---|---|---|
| 3,958,941 | 5/1976 | Regan | 23/253 PC |
| 4,289,594 | 9/1981 | Alpaugh et al. | 204/158 R |
| 4,317,044 | 2/1982 | Vaseen | 422/186.3 |
| 4,504,445 | 3/1985 | Walz | 210/760 |
| 4,694,179 | 9/1987 | Lew et al. | 210/760 |
| 4,808,287 | 2/1989 | Hark | 210/900 |
| 4,863,608 | 9/1989 | Kawai et al. | 210/900 |
| 4,892,712 | 1/1990 | Robertson et al. | 210/763 |
| 4,946,592 | 8/1990 | Galaj et al. | 210/500.25 |
| 4,959,142 | 9/1990 | Dempo | 210/167 |
| 4,971,687 | 11/1990 | Anderson | 210/85 |
| 4,990,311 | 2/1991 | Hirai et al. | 422/186.3 |
| 5,047,212 | 9/1991 | Blades et al. | 422/186.3 |
| 5,059,366 | 10/1991 | Galaj et al. | 210/500.25 |
| 5,061,374 | 10/1991 | Lewis | 210/900 |
| 5,069,782 | 12/1991 | Moyher, Jr. et al. | 210/192 |
| 5,069,885 | 12/1991 | Ritchie | 210/763 |
| 5,120,450 | 6/1992 | Stanley, Jr. | 210/760 |
| 5,126,111 | 6/1992 | Al-Ekabi et al. | 210/763 |
| 5,171,451 | 12/1992 | Khambatta et al. | 210/760 |

*Primary Examiner*—Peter A. Hruskoci
*Assistant Examiner*—Robert James Popovics
*Attorney, Agent, or Firm*—Bell, Seltzer, Park & Gibson

[57] ABSTRACT

An ultrapure water treatment system is provided by the present invention. The system comprises a housing, a water supply means including a water inlet and a water outlet communicating with the housing and defining a path of travel of the water from said inlet to said outlet, irradiation means for irradiating water with 185 nm UV light positioned within the housing, and a catalytic filter positioned in the path of travel of the water. The catalytic filter comprises a non-polymeric porous material having a photoactive catalyst thereon. Exemplary photoactive catalysts include $TiO_2$, $ZnO$, $WO_3$, $SnO_2$, $CU_2O$, and $CdSe$.

8 Claims, 3 Drawing Sheets

ULTRAPURE WATER TREATMENT SYSTEM

FIELD OF THE INVENTION

This invention relates to water treatment systems, and more particularly to a treatment system and method of ultrapurifying water.

BACKGROUND OF THE INVENTION

In order to manufacture advanced materials such as semiconductor devices, water which is substantially free of impurities and particularly organic impurities is often required. For example, in the process of manufacturing integrated circuit chips, one of the key steps therein is the cleaning process following chemical etching of the semiconductor wafer. The cleaning process includes rinsing the wafers in deionized water and drying the wafers by passing an inert gas over the wafers. The rinse process can require 9-12 rinses and over 2,000 gallons of water when etching multiple wafers. The cleanliness of the rinse water is critical to the performance characteristics of the semiconductor device. Even trace amounts on the parts per billion (ppb) level of contaminants, although often undetectable, can adversely effect the performance characteristics of the semiconductor device. Typically, the water must be purified "ultrapure" water. The purity is closely monitored by measuring resistivity, total organic carbon (TOC) and/or particulate count. For example, less than 50 ppb TOC level is desirable for use in manufacturing semiconductor devices.

Conventional treatment systems for ultrapurifying water use 185 nm ultraviolet (UV) light, ozone or reverse osmosis and combinations thereof (see, for example, U.S. Pat. No. 5,061,374 to Lewis). For example, UV treatment is often conducted by passing the water to be purified by a UV source which irradiates the water with 185 nm UV light. The problem with such systems is that the UV radiation tends to leak due to reflections out of the UV treatment unit. The leakage adversely affects the various polymeric materials used as piping and components connected to the UV treatment unit. The degradation and breakage of the polymeric parts is an additional source of organic contamination, particularly over prolonged exposure to the UV radiation. To minimize these problems, elbows and valves are sometimes placed at the inlet and outlet of the UV treatment unit to reduce direct exposure of the polymeric parts to the UV radiation. These techniques are typically ineffective and can also become additional sources of contamination.

SUMMARY OF THE INVENTION

It is, therefore, an object of the present invention to provide an ultrapure water treatment system.

It is another object of the invention to provide a method of ultrapurifying water.

It is yet another object of the invention to provide a treatment system and a method for removing ppb levels of organic contaminants while avoiding the problems associated with exposure of polymeric parts to UV radiation.

These and other objects are provided according to the present invention by an ultrapure water treatment system. The system comprises a housing, a water supply means including a water inlet and a water outlet communicating with said housing and defining a path of travel of the water from said inlet to said outlet, irradiation means for irradiating water in the housing with UV light having a wavelength of about 180 nm to about 190 nm, and preferably having a wavelength of about 185 nm, and catalytic filter means positioned in the path of travel of the water. The catalytic filter means comprises a non-polymeric porous material having a photoactive catalyst thereon. Exemplary photoactive catalysts include $TiO_2$, $ZnO$, $WO_3$, $SnO_2$, $CU_2O$, $CdS$ and $CdSe$.

Such a water treatment system can be used to purify water to a low ppb level of organic contaminants while avoiding the problems associated with leakage of UV light. Preferably, the catalytic filter means is positioned between the housing and the water outlet, and any leakage of UV light activates the photoactive catalyst rather than adversely effecting the polymeric parts of the treatment system.

In operation, a stream of water is passed by the means of irradiation. The UV light disassociates water to form hydroxyl or hydroperoxyl radicals. The radicals oxidize the carbon-containing organic contaminants to form intermediate compounds which react and either form $CO_2$ or are collected on the surface of the catalytic filter. The UV light also activates the catalyst of the porous catalytic filter. Additional oxidation of the organic contaminants to $CO_2$ can also occur at the filter surface and inside the filter in that it is thought the radicals formed by exposure to UV light penetrate into the depths of the filter to oxidize additional organic contaminants.

DESCRIPTION OF THE PREFERRED EMBODIMENTS

The present invention will now be described more fully hereinafter. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Figure 1:
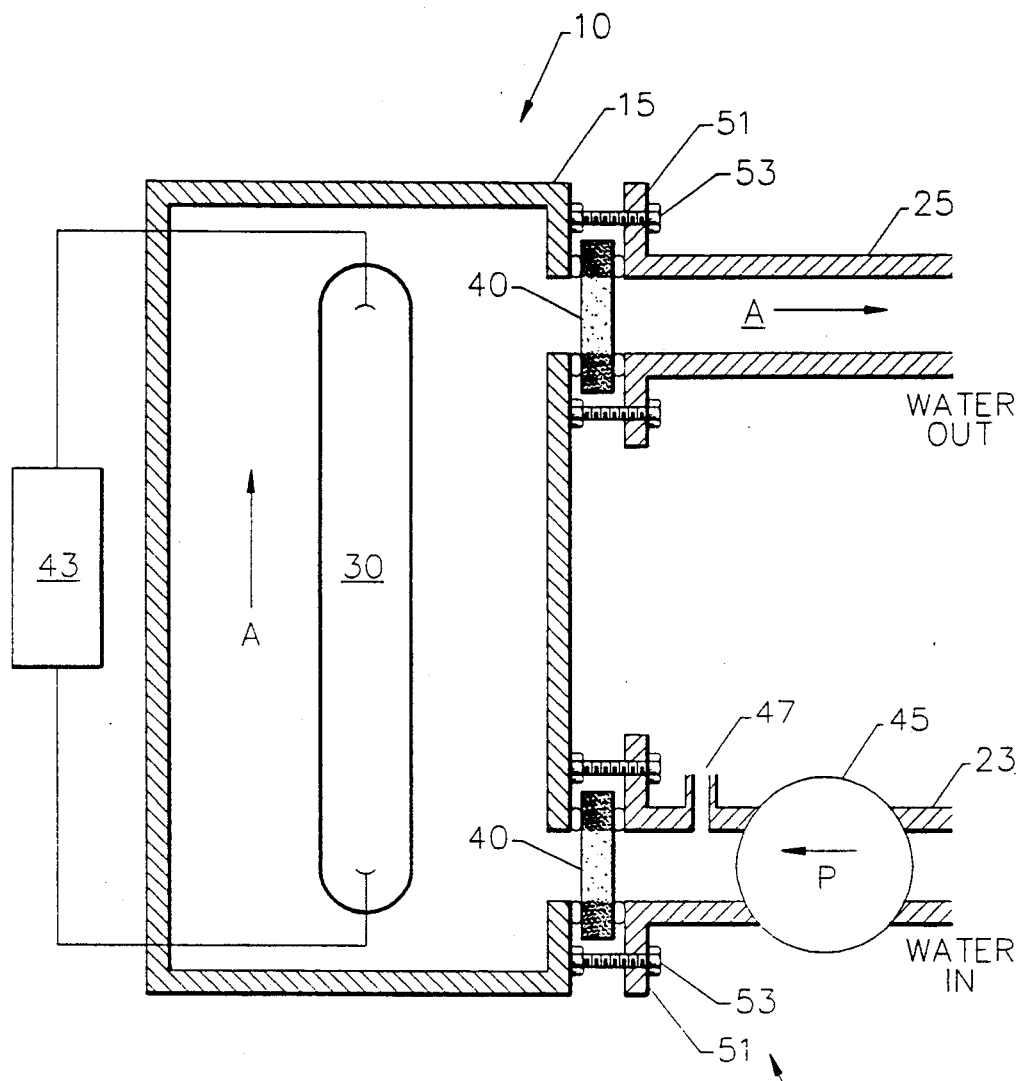
FIG. 1 is a schematic diagram of the ultrapure water treatment system of the present invention.

Referring to FIG. 1, the ultrapure water treatment system of the present invention is designated by the reference numeral 10. The water treatment system 10 comprises a housing 15, a water supply means 20, a UV lamp 30 or other irradiation means for irradiating water with UV light in the housing 15 of wavelength of about 180 to about 190 nm, and preferably having a wavelength of about 185 nm, and a catalytic filter means 40. An exemplary irradiation means is Aquafine Model SL-1 Sterilizer available from Aquafine Corporation, Valencia, California, and is preferably positioned in the housing. The UV lamp 30 is controlled by an electronic control device 43 or other known means for controlling the lamp. The water supply means 20 includes a water inlet 23 and a water outlet 25 communicating with the housing 15 and defining a path of travel a of the water into the housing 15 via the inlet 23 and out of housing 15 via the outlet 25. The supply of water can be controlled by a pump 45. Additionally, ozone injecting means 47 or other means for providing ozone can be provided and can, for example, communicate with the water inlet 23 (as shown) or with the housing 15 (not shown). The catalytic filter means 40 is positioned within the path of travel A of the water, and typically is mounted external of the housing and between the water outlet 25 and the housing 15. An exemplary manner of connecting the catalytic filter means 40 to the inlet 23 and/or outlet 25 is shown in FIG. 1. A flange 51 is positioned using a bolt 53 so as to maintain the filter means 40 in the path of travel A of the water. Optionally gaskets 57 can be used to further maintain the filter means 40 in position. Other means for mounting the filter means 40 will be readily apparent to those skilled in the art.

The catalytic filter means 40 comprises a porous non-polymeric support having a photoactive catalyst thereon. Exemplary non-polymeric materials include stainless steel, glass, porous metals and porous ceramics. Exemplary photoactive catalysts include metal oxides such as $TiO_2$, $ZnO$, $WO_3$, $SnO_2$ and $Cu_2O$, and $CdS$ and $CdSe$. There are several methods of producing the filters. For example, a porous non-polymeric support can be impregnated with various metal salts or alkoxides to impregnate the support with the metal. Then the support is dried and calcined to form the metal oxide. Another method of producing the filter is to form a porous disk of the metal/metal oxide (e.g., titanium/titanium oxide). Such a disk is typically made by pressing or sintering the metal/metal oxide in powder form.

In operation, a stream of water is supplied and irradiated with UV light having a wavelength of about 180 nm to about 190 nm, and preferably having a wavelength of about 185 nm. The irradiated water is then passed through the catalytic filter means 40 preferably positioned in the water outlet 25. Catalytic reaction (i.e. the formation of hydroxyl and hydroperoxyl reactive radicals) occurs not only on the surface of the filter means 40 but throughout the interior of the filter means. The radicals oxidize the carbon-containing organic contaminants to form intermediate compounds which react and either form $CO_2$ or are collected on the surface of the catalytic filter means 40. The UV light also activates the catalyst of the porous catalytic filter, and additional oxidation of the organic contaminants to $CO_2$ occurs inside the filter. Optionally, the water can be initially passed through a catalytic filter means 40 positioned in the water inlet 23. The function of the filter means positioned therein is primarily to block leakage of any UV light although some catalytic effect does occur because of the generation of reactive radicals due photoactivation of the catalyst. Additionally, ozone or hydrogen peroxide can also be injected into the water to facilitate formation of the reaction radicals.

The present invention is further illustrated by the following examples.

EXAMPLE 1

Figure 2:
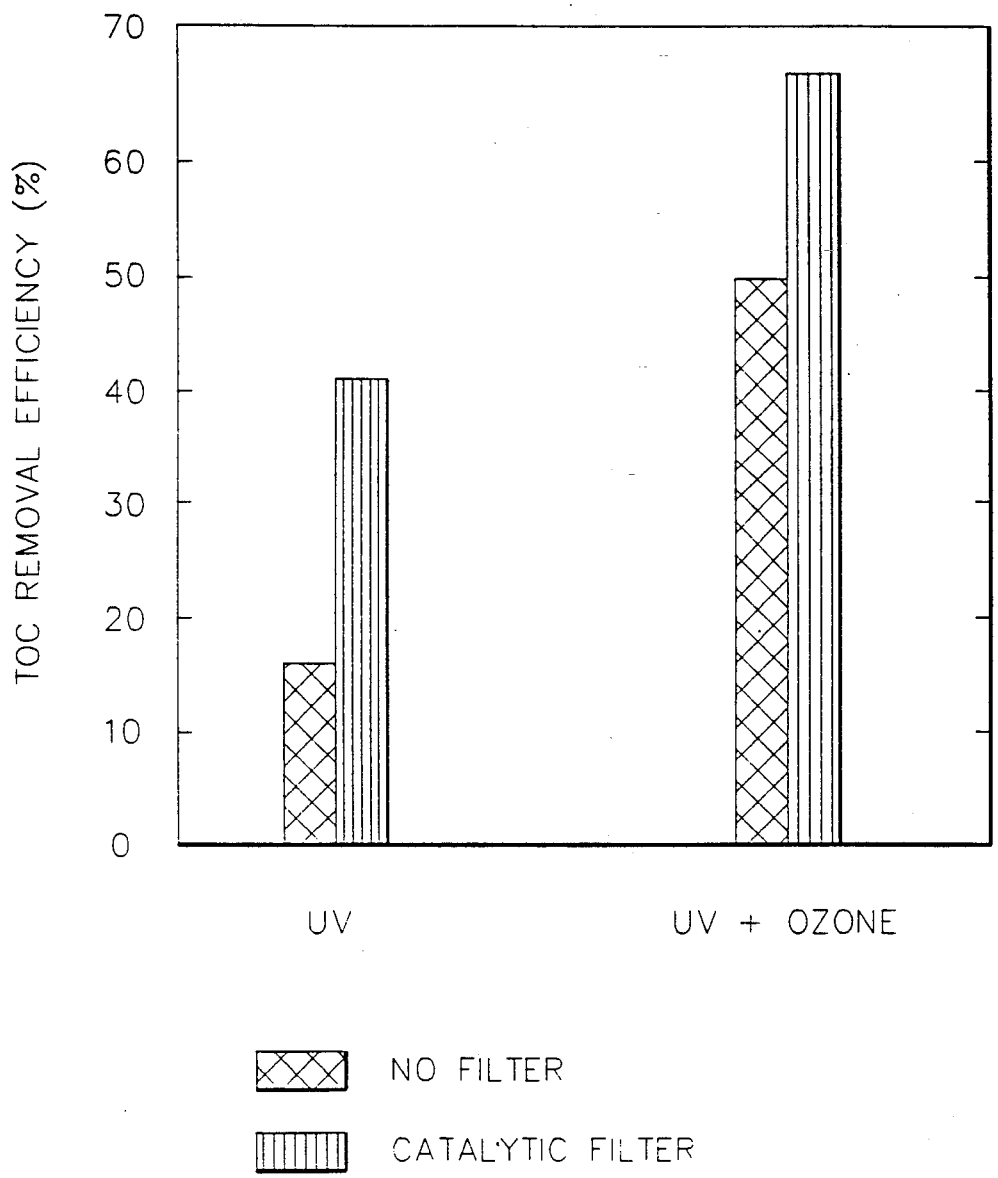
FIG. 2 is a graph of removal efficiency of the ultrapure water system when the organic contaminant is humic acid as described in Examples 1 and 2.

Water having a concentration of 25 ppb humic acid is prepared. The water is passed into the housing 15 of the UV water treatment system 10 shown in FIG. 1 at a rate of 3 gal/minute and irradiated with 185 nm light from the UV lamp 30. The water then passes through a catalytic filter 40 comprising a 1 inch diameter $TiO_2$ disk positioned in the water outlet 25. The removal efficiencies of the UV water treatment system 10 as percent TOC with and without the filter are compared graphically in FIG. 2, and shows that about a 25 percent increase of removal effiency results when using the filter.

EXAMPLE 2

Example 1 is repeated except ozone is also injected into the stream of water. The removal efficiencies with and without the filter are compared graphically in FIG. 2, and shows that about a 18 percent increase of removal effiency results when using the filter.

EXAMPLE 3

Figure 3:
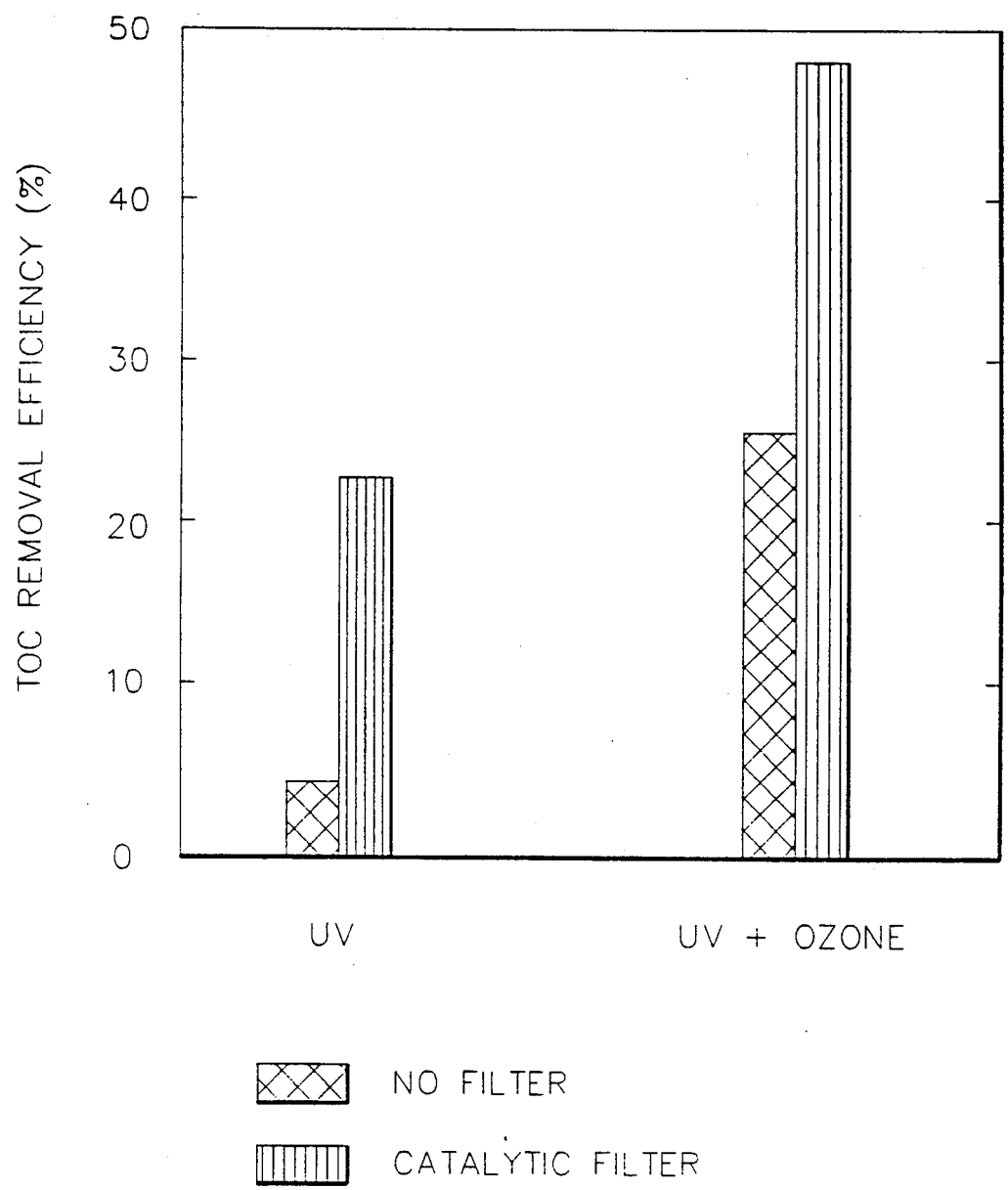
FIG. 3 is a graph of removal efficiency of the ultrapure water system when the organic contaminant is lipopolysaccharides as described in Example 3 and 4.

Example 1 is repeated except the water having 25 ppb lipopolysaccharides is prepared. The removal efficiencies as percent TOC with and without the filter are compared graphically in FIG. 3, and shows that about a 20 percent increase of removal effiency results when using the filter.

EXAMPLE 4

Example 3 is repeated except ozone is also injected into the stream of water. The removal efficiencies with and without the filter are compared graphically in FIG. 3, and shows that about a 25 percent increase of removal effiency results when using the filter.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

We claim:
1. An ultrapure water treatment system comprising:
   a housing,
   water supply means including a water inlet and a water outlet communicating with said housing and defining a path of travel of the water from said inlet to said outlet,
   irradiation means for irradiating water in the housing with UV light of wavelength of 180 nm to 190 nm,
   and catalytic filter means positioned within said path of travel of the water external of said housing and between said housing and said water outlet such that all water flowing from said housing passes therethrough, said filter blocking the leakage of any UV light, said catalytic filter means comprising a non-polymeric porous support having a photoactive catalyst having the ability to convert organic contaminants to carbon dioxide thereon.

2. An ultrapure water treatment system according to claim 1 wherein said non-polymeric porous material is selected from the group consisting of stainless steel, glass, porous metals and porous ceramics.

3. An ultrapure water treatment system according to claim 1 wherein said photoactive catalyst deposited on said non-polymeric porous material is selected from the group consisting of $TiO_2$, $ZnO$, $WO_3$, $SnO_2$, $Cu_2O$, $CdS$, and $CdSe$.

4. An ultrapure water treatment system according to claim 1 including means for introducing ozone into the water.

5. An ultrapure water treatment system according to claim 1 including a second catalytic filter means positioned within said path of travel of the water external to said housing and between said housing and said water inlet such that all water flowing into said housing passes therethrough, said filter blocking the leakage of any UV light, said catalytic filter means comprising a non-polymeric porous support having a photoactive catalyst having the ability to convert organic contaminants to carbon dioxide thereon.

6. An ultrapure water treatment system comprising:
a housing;
water supply means including a water inlet and a water outlet communicating with said housing and defining a path of travel of the water from said inlet to said outlet;
irradiation means for irradiating water in the housing with UV light of wavelength of 185 nm, said irradiation means positioned within said housing; and
catalytic filter means positioned within said path of travel of the water, external of said housing and between said housing and said water outlet such that all water flowing from said housing passes therethrough, said filter blocking the leakage of any UV light, said non-polymeric porous support having a photoactive catalyst.

7. An ultrapure water treatment system according to claim 6 including means for introducing ozone into the water.

8. An ultrapure water treatment system according to claim 6 including a second catalytic filter means positioned within said path of travel of the water external of said housing and between said housing and said water inlet such that all water flowing into said housing passes therethrough, said filter blocking the leakage of any UV light, said catalytic filter means comprising a non-polymeric porous support selected from the group consisting of stainless steel, glass, porous metal and porous ceramic, said non-polymeric porous support having a photoactive catalyst selected from the group consisting of $TiO_2$, $ZnO$, $WO_3$, $SnO_2$, $Cu_2O$, $CdS$, and $CdSe$ thereon.

* * * * *